United States Patent [19]
Juvet, Jr. et al.

[11] 3,902,848
[45] Sept. 2, 1975

[54] LIQUID CHROMATOGRAPHY DETECTOR AND METHOD

[75] Inventors: Richard S. Juvet, Jr.; Richard A. Mowery, Jr., both of Phoenix, Ariz.

[73] Assignee: Research Corporation, New York, N.Y.

[22] Filed: June 26, 1974

[21] Appl. No.: 483,297

[52] U.S. Cl.......... 23/230 R; 23/253 R; 73/61.1 R; 73/61.1 C; 324/71 R
[51] Int. Cl.................. G01n 27/30; G01n 27/26; G01n 31/08
[58] Field of Search.............. 23/230 R, 253 R, 259; 73/61.1 R, 61.1 C; 210/31 C; 324/71 R

[56] References Cited
UNITED STATES PATENTS
3,352,643  11/1967  Ando et al............. 23/253 R Primary Examiner—R. E. Serwin
Attorney, Agent, or Firm—Oblon, Fisher, Spivak, McClelland & Maier

[57] ABSTRACT

An extremely sensitive liquid chromatography detector is disclosed which detects solutes electrically through a direct spray technique. In operation effluent is sprayed from an aspirator at the outlet of the liquid chromatograph column onto a suitable target electrode, the varying potential or current generated providing a direct indication of trace amounts of eluted solute in the sprayed effluent. Accurate quantitative measurements may be made using the method and apparatus of the invention.

22 Claims, 2 Drawing Figures

3,902,848

LIQUID CHROMATOGRAPHY DETECTOR AND METHOD

BACKGROUND OF THE INVENTION

1. Field of the Invention

This invention relates generally to liquid chromatography, and more particularly to a method and apparatus for detecting solutes in a sprayed effluent.

2. Description of the Prior Art

The detector in liquid chromatography is the device or apparatus which detects each of the components sequentially as they are eluted from the column by the mobile phase. The response of the detector is a measure of the concentration of a particular solute component. A problem of liquid chromatography detection systems is that the physical properties of the mobile phase are often similar to those of the solute, thus complicating the detection of the solutes. In order to overcome the difficulty associated with the detection of the solute components, the prior art developed techniques in which (1) the mobile phase was removed before detection, (2) a property of the solute was selected in which the mobile phase does not interfere, or (3) slight differences between a bulk physical property of the solute and mobile phase were employed.

All present day liquid chromatography detectors utilize at least one of the alternative separating techniques described above. The wire-transport flame ionization detector, for example, eliminates the more volatile solvent or mobile phase with an oven, and is thus an example of the first technique. The ultraviolet detector, which can be used only when the solute and the mobile phase do not absorb radiation of the same wavelength, is an example of the second technique. The differential refractometer detector, which monitors the difference in refractive indices of sample in the mobile phase as compared to the pure mobile phase, is an example of the last technique.

In addition to relying upon the different principles of operation mentioned above, liquid chromatography detectors can also be classified as being either destructive or non-destructive, depending upon whether or not the solute sample is destroyed in the process of its detection. It is desirable that detectors operate in a non-destructive manner so that they may aid in the recovery of small separated fractions of solute.

Liquid chromatography detectors may also be termed selective if they respond to a limited class of compounds, or universal if they respond to a wide range of compounds. Detectors usable with the widest possible range of compounds are generally the most desirable.

Certain parameters are significant in developing standards for evaluating detector performances. One such parameter is the detection of the minimum amount of the eluted solute in the mobile phase which is distinguishable above the baseline noise of the detector. Another parameter is sensitivity, which is defined as the ratio of the detector response to the amount of solute eluted. The greater the signal output per given amount of solute, the greater the sensitivity. A third parameter is the linear dynamic range, which is defined as the ratio of the maximum to minimum sample concentration over which the detector output remains linear within 5%. Finally, the repeatability of a detector is defined as the ability of a particular detector to generate the same response for repeated injections of the same quantity of sample.

The most commonly used liquid chromatography detectors are the ultraviolet detector, the refractive index detector, the microadsorption detector and the wire transport flame ionization detector. All of these detectors have certain shortcomings which limit their utility. For example, the untraviolet detector, which can be quite sensitive, is very "selective" and is thus suitable for use only with a relatively narrow range of solute types.

The refractive index detector, which is second in popularity to the ultraviolet detector, is extremely sensitive to temperature changes, and thus must be operated in a closely controlled thermal environment. Furthermore, this detector is relatively insensitive so that samples must be in milligram quantities, in general, before they can be successfully detected.

The microadsorption detector is also highly sensitive to temperature changes and must be maintained in a closely controlled thermal environment to produce acceptable results. Furthermore, the output signal for this type detector is an asymmetric, first derivative-type curve and detectors of this type are flow sensitive, have limited application with gradient elution techniques, and the sensitivity and linear range is also quite limited.

The wire-transport flame ionization detector is susceptible to considerable noise owing to uneven wire coatings. Thus, this type of system requires careful control of both wire speed and gas flow rate in order to obtain good results. Furthermore, this type detector is restricted to use with a volatile mobile phase and nonvolatile solutes which will remain on the wire after exposure to an evaporating oven.

Other more unique types of liquid chromatography detectors, such as that disclosed in U.S. Pat. No. 3,352,643 to Ando et al. are also known. The device described in the Ando patent uses either water or an organic solvent as the mobile phase. The mobile phase is passed over an electrode structure at which the streaming potential of the fluid is measured for analysis. The streaming potential described in this patent appears to be quite low, suggesting that the ultimate sensitivity of the device described in the patent may be limited. Furthermore, it appears that in the device described in the patent, the formation of a streaming potential causes a flow of ions in a direction opposite to that in which the carrier liquid flows. The ion flow can cause an electric countercurrent within the detector tube tending to reduce or nullify the streaming potential, thereby substantially reducing the sensitivity of the apparatus.

The comments set forth above emphasize the deficiencies inherent in many of the presently used chromatograph detector systems. Although these systems also have advantages, it is apparent that a need exists for a novel type of detector system of nearly universal applicability, capable of exceptional performance in terms of the parameters discussed above. It is also evident that a new method of detection which minimizes the deficiencies present in currently existing methods would also be of significant value to the scientific community.

SUMMARY OF THE INVENTION

Accordingly, it is one object of this invention to provide a novel method of detecting solutes.

Another object of the present invention is the provision of a novel apparatus for detecting minute quantities of solutes.

A still further object of this invention is the provision of a novel method of detecting solutes subsequent to a chromatographic separating process.

Another object of this invention is the provision of a novel apparatus for detecting solutes subsequent to a chromatographic separating process.

A still further object of this invention is the provision of a novel method for detecting minute quantities of solutes using the phenomenon of spray or waterfall electricity in which a potential and/or current is generated by a violent rupture of a liquid surface by the action of a gas, liquid, or solid.

Yet another object of this invention is the provision of a novel apparatus for electrically detecting minute quantities of solutes by measuring waterfall or spray potential or current.

Briefly, these and other objects of the present invention are achieved by spraying the eluent from a liquid chromatographic column onto a suitable target electrode, whereby spray or waterfall potentials are developed. The potential and current generated at the electrode surface is highly sensitive to individual solutes sprayed from the chromatographic column. Thus, by accurately measuring the potential or current generated at the electrode surface, reliable determinations of the concentrations of solute in the mobile phase flowing from the chromatographic column are readily made.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

As the present invention utilizes the principle of spray or waterfall electricity, a few initial comments regarding the nature of this electrical phenomenon are in order.

In 1915 a theory known as the "electrical double layer theory" was developed by Lenard in order to explain the observation of charge separation at liquid-solid interfaces, such as exist at the base of a waterfall. While Lenard's 1915 double layer theory is disputed by many theoreticians, it is still a widely quoted theory on charge separation.

Although many experimenters have obtained results which appear to be inconsistent with the double layer theory, all agree that the phenomenon of charge separation does occur. Over the years, such eminent scientists as Michael Faraday and J. J. Thompson have conducted experiments in spray electricity resulting in the accumulation of important experimental information. However, no reliable theory explaining all of the behavioral aspects of the accumulated data has yet been proposed.

Although the scientific literature includes considerable controversy over the theoretical aspects of charge separation in spray electricity, most experimenters agree on the basic criteria for charge separation. These criteria include the fact that no charge separation occurs unless there is a violent rupture of a liquid surface by the action of a gas, another liquid or a solid. A sudden change in surface area must also occur in combination with the exposure of fresh or raw surfaces. If these basic criteria are satisfied, a net, detectable charge separation will occur.

In the past, charge separation has been achieved by spraying a liquid onto a solid platinum plate, atomizing a liquid by spraying it into a moving on stationary body of gas, bubbling a gas through a liquid creating an interface at the surface of the liquid and impacting drops of liquid onto a solid surface.

Figure 1:
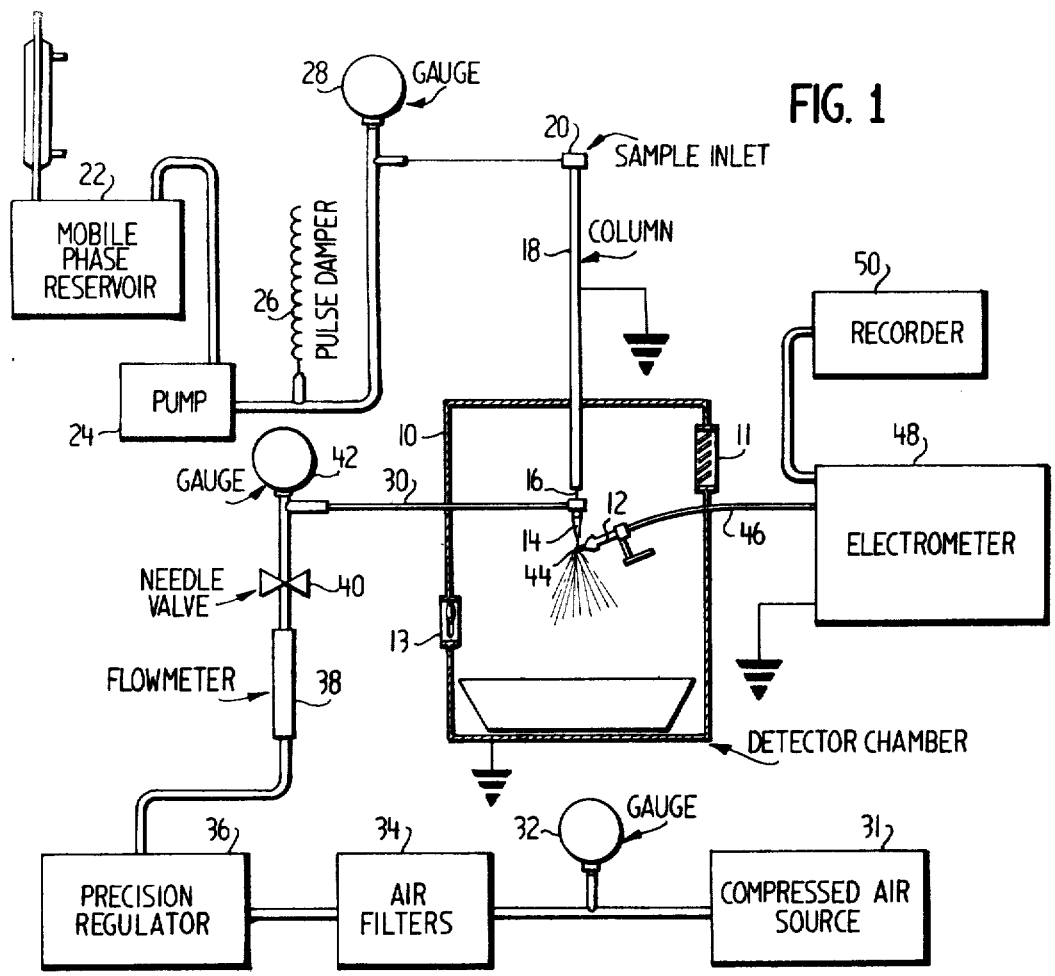
FIG. 1 is a schematic diagram of the overall system of the present invention.

Having thus described the general principles underlying the generation of spray electricity, attention is now directed to the drawings, wherein like reference numerals designate identical or corresponding parts throughout the several views, and more particularly to FIG. 1 thereof showing the overall system of the present invention.

The detector assembly of the present invention is shown in an enclosure designated by the numeral 10. This enclosure may be a metal box $27 \times 21 \times 16$ inches with an opening of 5 inches diameter providing for the inlet of room air filtered through a layer of absorbent charcoal 11 and a 5 inch diameter outlet fitted with a whisper fan 13, both openings arranged in such a geometry that spray droplets formed at the enclosed target electrode are directed away from the target electrode. The chamber front has a removable plastic window for ready access to the detector components. This enclosure is used to filter laboratory air which may contain components affecting the detector (tobacco smoke or other chemicals) and to decrease noise produced by the build up of charged droplets near the target electrode. Of course, other dimensions for the enclosure and openings may be used as convenient. The detector assembly includes an electrode mount 12 and a nozzle structure 14. The nozzle structure 14 receives one fluid input through a feed line 16 which is coupled to a liquid chromatograph column 18. The liquid chromatograph column 18 includes a syringe injection inlet port 20 to which a conventional liquid chromatograph system, including a mobile phase reservoir 22, a reciprocating pump 24, a pulse damper 26 and a pressure gauge 28, are coupled. A 4-liter heated, stainless steel container was used as the mobile phase reservoir; heating of the mobile phase being desirable to remove dissolved carbon dioxide for noise reduction and improvement of the baseline current. The liquid chromatograph column and the associated liquid chromatograph system with the exception of the heated reservoir degassing system could have been any conventional, commercially available system, many varieties of which are well known to those skilled in the art.

A pressure line 30 is also coupled to the nozzle structure 14 for providing a means of propelling the liquid eluent from the chromatograph column through the nozzle structure 14.

The preferred means of propelling the eluent through the nozzle 14 is with pressurized air from a suitable compressed air source 31. The compressed air source may be an individual air compressor, such as a Devilbiss model PUBH 3030, or it may be a conventional laboratory air line provided the pressure is maintained preferably in the range from 90 – 110 p.s.i. at gauge 32.

A primary pressure gauge 32 of a conventional type is coupled to the compressed air line as it exits from the compressed air source for monitoring the air pressure on the line. The pressure gauge 32 is selected to monitor pressures in the range typically present on the compressed air line, in this case, the suggested pressure range is approximtely 90 – 110 p.s.i.

An air filter 34 is included in the air line after the pressure gauge 32. The air filter consists of a particle filter selected to remove particles down to less than 5 microns in diameter from the air flow (it may be a conventional model 1137-2FX filter manufactured by the Wilkerson Corporation, for example) and an oil filter for removing oil particles in the air flow (a conventional Wilkerson MICROalescer (TM) model 1237-2F, for example) which is capable of reducing the oil concentration in the air to 0.1 ppm, or less. The output of the oil filter is fed to a precision pressure regulator 36 for accurately regulating the final output pressure of the air line. The pressure regulator 36 may, for example, be a Norgren model 11-018 pressure regulator set at approximately 50 psig, and capable of controlling pressure within 0.07 psig. A flowmeter 38, which is provided for estimating the flow rate of the air stream, may be a conventional Fischer and Porter Company precision bore flowmeter, Model 01-N150-A/1, for example. A conventional precision Nupro needle valve 40 is also provided for adjusting the air flow.

An aspirator pressure gauge 42 is coupled to the output of needle valve 40 and to the pressure line 30 directly feeding nozzle structure 14. The aspirator pressure gauge thus acts as a direct monitor of the pressure drop across the nozzle structure 14. Any suitable conventional pressure gauge having a sensitivity compatible with the remaining portions of the system is suitable for use with the present invention.

The compression air feed system discussed above is designed to provide a highly purified and filtered air stream at a carefully regulated pressure and rate of flow to the nozzle structure 14 in order to insure that the eluent emitted from the chromatograph column for analysis is subjected to a minimum of contamination from the air supply and is sprayed toward the electrode mount 12 at as uniform a rate as is possible. Naturally, some components of the air supply system can be removed or modified, as will be explained subsequently. Additional filtering and flow controlling components can, of course, be added to the system to further improve the purity and flow rate control of the air supply system, should such additional components be necessary in particular situations.

The electrical portion of the system includes a suitable target electrode 44 contained in the electrode mount 12 and coupled through an electrical lead 46 to an electrometer 48. Any high quality electrometer of suitable sensitivity can be used, such as Keithley model 610A. The output of the electrometer 48 is coupled to, and continuously recorded as a function of time by, a conventional chart recorder 50, such as a Sargent model MR recorder.

Figure 2:
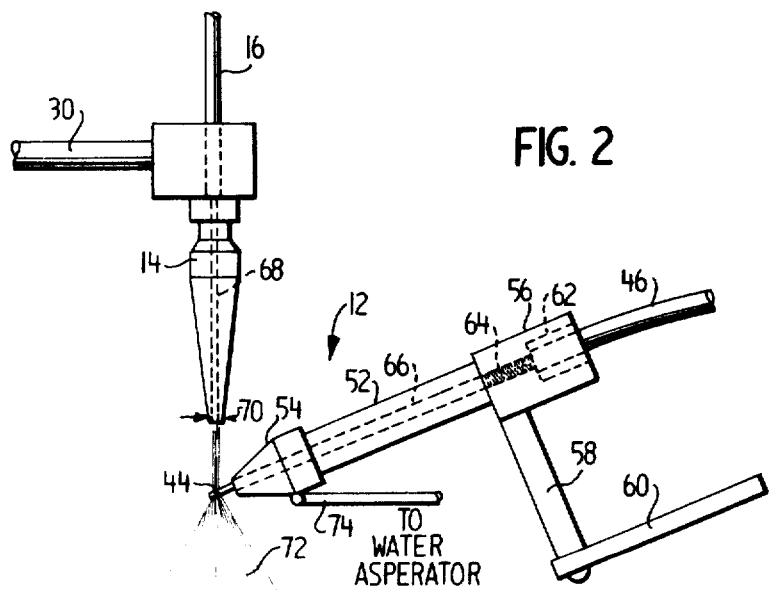
FIG. 2 is a detailed illustration of the spray nozzle and electrode structure of the present invention.

Referring now to FIG. 2, the structure of the detector assembly is shown in greater detail. In particular, the electrode mount 12 includes a main body portion 52 with a machined head portion 54 as indicated in FIG.

2. The main body portion 52 is also enlarged to form a contact block 56 which in turn is coupled by means of a spacing arm 58 to a support arm 60. The main body portion 52 of the electrode mount 12, along with the head 54, the contact block 56 and the spacing arm 58 are formed of commercially available Teflon (TM) polytethafluorethylene plastic while the support arm is preferably formed of a high resistance laminated plastic structure. Teflon has the advantages of not being wetted by water and of being easily machined. Other materials such as sapphire, polyethylene, Kel-F and PVC may be equally useful, as is known to those skilled in the art.

The electrical lead 46, which may also be described as the electrometer input cable, is inserted into a suitable aperture 62 in the rear of contact block 56, and is securely fastened therein by means of a conventional epoxy cement. The target electrode 44, preferably formed of glassy carbon, gold, or gold plated platinum wire is mounted in the head 54. Two techniques have been used for connecting the lead 46 with the target electrode 44. According to the first technique, a conventional steel spring 64 is soldered to the lead 46, and one end of the target electrode, which extends through the main body portion 52, is forced into the spring coil to make a good electrical contact therewith. According to the second technique, a wire 66 of platinum or another suitable material is silver soldered to the lead 46 for connecting it with the target electrode 44.

The nozzle structure 14 includes a stainless steel or brass aspirator with an inner capillary tube 68 connected to the feedline 16. Pressure line 30 connects to the base of the nozzle 14 and the purified air flows past the tip of the inner capillary tube. The nozzle structure used included an inner capillary tube having an interior diameter of approximately 0.015 and a nozzle aperture 70 of approximately 0.033 in., although other sizes may also be used.

Apertures of these diameters are suitable for operating the present invention in the appropriate range of flow rates, such as 2–7 ml./min. of liquid from the chromatograph column 18 and 2,000 – 7,000 ml./min. of air from the air pressure supply system. The spacing between the tip of the nozzle structure 14 and the target electrode 44 is preferably on the order of 0.6 cm. at the flow rates typically used.

When the arrangement illustrated in FIG. 2 is operational, a high velocity stream of fluid particles is ejected from the nozzle structure 14 to impinge upon the target electrode 44 forming a resulting spray 72 of highly charged droplets.

Having thus described the general nature of the apparatus of the present invention, its mode of operation will now be described in detail. Initially, the compressed air system is activated so that a supply of compressed air is available at the detector assembly. The needle valve 40 and other components of the air supply system are adjusted to provide a suitable air pressure at the aspirator tip, preferably in the range of from 9 – 30 p.s.i. An average air pressure of about 10 p.s.i. produces a baseline output current at the electrometer of approximately $10^{-8}$ amps while a higher air pressure may increase the baseline current into the range of $10^{-6}$ amps. The primary air pressure from the compressed air source 31 is preferably maintained in the range of approximately 90 – 110 p.s.i. and this air pressure is carefully regulated to maintain the pressure at the tip of the nozzle structure 14 constant. Air flow volume is preferably set between 2000 ml./min. and 7,000 ml./min. The average flow rate at an air pressure of 10 p.s.i. is approximately 4,000 ml./min.

These specific air pressure figures are not critical in the operation of the present invention, but are included as representative of normal operating characteristics.

The operating parameters of the liquid chromatograph system are variable and depend upon the nature of the chromatograph system itself, the length of the chromatograph column, the ambient temperature and the liquid flow rate. Selecting a minimum flow rate and using a four foot chromatograph column, input pressures of 380 p.s.i. at 27°C or 270 p.s.i. at 41°C were found suitable. The stated fluid pressures represent the input pressures of the mobile phase at the inlet of the chromatograph column. The system of the present invention has been operated under conditions that produce a mobile phase pressure of from 350 – 700 p.s.i., although pressures considerably higher than this would have no effect on the detector. The liquid flow rate associated with the chromatograph system is between 2.25 ml./min. and approximately 7.5 ml./min. A suitable average flow rate is about 3.0 ml./min. Similarly, the operating temperature of the chromatograph column may be between approximately 25°C and about 55°C. A typical operating temperature is about 40°C. Again, although these parameters of the chromatograph system are not critical to the operation of the detector of the present invention, they are presented as exemplary of a normal range of operation.

When the air and chromatograph systems are operational, a suitable fluid sample is injected into the syringe injection port 20 of the chromatograph column. As the sample flows through the column, its solute components are separated in the conventional manner on the basis of their different retention times. The time of sample injection is noted on the output of chart recorder 50 so that the time of occurrence of the peaks generated by the detector can be correlated with the retention times of the solute components contained in the sample.

As material is eluted from the chromatograph column 18, it flows into the nozzle structure 14 at essentially atmospheric pressure. It then comes into contact with the relatively high pressure air stream entering the nozzle 14 through pressure line 30, at which point the liquid output of the chromatograph column is sprayed as a stream of droplets against the target electrode 44. The air pressure supplied to the system is normally adjusted so that the potential produced by the mobile phase eluted from the chromatograph is in the range of from 700 to 800 volts at the electrode 44. Although potentials of well over 2,000 volts can be developed at the electrode 44, the 700 to 800 volt range is exemplary of the normal operating range of the detector of the present invention.

Upon reaching the electrode 44, the solute components of the sample cause significant changes in the potential and current generated at the electrode, due to the differing spray potential characteristics of these solute components. The changing signals at the electrode are then detected by the electrometer 48 and recorded by the chart recorder 50.

The potential or current generated at the electrode varies with the concentration of the solute components in the mobile phase. For mixtures of components the curve appearing at the output of the chart recorder 50 will consist of one or more generally bell-shaped peaks, the times of occurrence of which qualitiatively identify the materials eluted from the chromatograph column, as is known to those skilled in the art of chromatography. It is noted that either the potential or the current at the electrode may be measured although at present current measurements are more conveniently made. The areas under the peaks developed by the chart recorder provide a quantitative measure of the concentrations of the materials contained in the sample. Thus, the graphical output of the chart recorder provides an accurate qualitative and quantitative measure of the materials contained in the injected sample.

To illustrate the extreme sensitivity of the spray impact detector of the present invention, three examples are provided below.

EXAMPLE 1

Injection of an aqueous solution containing $1.5 \times 10^{-7}$ g. of o-nitrophenol into chromatograph column 18 causes a 400 volt change in the electrode potential as the nitrophenol is eluted from the column.

EXAMPLE 2

Trace amounts of detergents, such as sodium dodecylsulfate, may be detected at a level of 0.5 nanogram/second; amino acids such as glycine at a level of 50 picograms/second; and bile acid salts such as sodium cholicate at a level of 25 picograms/second.

EXAMPLE 3

The amount of dissolved carbon dioxide present in distilled water may be readily detected.

Further experimental results obtained using the detector of the present invention are set forth in Table 1. Table 1 sets forth in the lefthand column thereof twelve arbitrarily selected compounds which may be detected using the apparatus of the present invention. The middle column of Table 1 sets forth the limits of detection possible with the apparatus of the present invention. The figures shown were arrived at by injecting a series of progressively smaller known quantities of the listed compounds until the output peak developed by the electrometer was twice the height of the peak-to-peak noise developed by the system. The limits of detection are expressed in grams per second meaning that the listed figures were divided by the width of the obtained curve so that the figures are independent of the retention time parameter which is determined by the chromatographic column. The righthand column in the table indicates the linear dynamic range of the apparatus of the present invention for the various listed compounds. The linear dynamic range is represented in orders of magnitude (base 10). The linear dynamic range was defined as extending from the limit of detection to the highest concentration of a particular compound at which the deviation from linearity was within 5%. (See Table 1).

TABLE 1

| Compound | Limit of Detection (g/sec) | Linear Dyanamic Range (log) |
| --- | --- | --- |
| Octanoic Acid | $7.1 \times 10^{-11}$ | 4.0 |
| Nonanoic Acid | $8.0 \times 10^{-11}$ | 4.0 |
| Decanoic Acid | $5.0 \times 10^{-11}$ | 4.0 |
| O-Nitrophenol | $9.7 \times 10^{-10}$ | 3.5 |
| [structure: phenyl-NH-naphthyl-$SO_3NH_4$] | $9.1 \times 10^{-10}$ | 3.5 |
| Ethyl Butyrate | $1.0 \times 10^{-7}$ | Incomplete; at least 2.5 |
| n-Octanol | $8.0 \times 10^{-8}$ | — |
| $C_{12}H_{25}SO_4Na$ | $4.9 \times 10^{-10}$ | 3.5 |
| $KNO_3$ | $8.6 \times 10^{-10}$ | 2.8 |
| $La(NO_3)_3$ | $3.7 \times 10^{-10}$ | 3.0 |
| $LiNO_3$ | $1.3 \times 10^{-9}$ | 2.7 |
| $Th(NO_3)_4$ | $4.8 \times 10^{-10}$ | 3.0 |
| $CF_3\overset{O}{\overset{\|}{C}}CH_2\overset{O}{\overset{\|}{C}}CH_3$ | $2.6 \times 10^{-10}$ | 4.0 |

($H_2O$ was mobile phase)

It is believed that those skilled in the art will immediately see by reference to Table 1 that the detector of the present invention is suitable for use with a wide range of compounds, is extraordinarily sensitive, and generally has a very wide linear dynamic range.

Numerous modifications and variations of the present invention are possible in view of the teachings set forth above. For example, the air system can be simplified from that shown in FIG. 1. The present invention has been successfully operated using a conventional laboratory air supply with only an oil filter and suitable pressure and flow controlling units coupled to the air supply. Clearly, if compressed air or some other gas, uncontaminated by hydrocarbons is available for use as a nozzle pressure source, the oil filter may be eliminated.

The shape of the electrode mount 12 and the material from which it is formed are important in reducing system noise. In particular, Teflon was selected as the material of the electrode mount 12 in view of the fact that it is nonwettable by the most conventional mobile phase solvents, such as water or mixtures of water with certain organic solvents. This is a significant factor since a wettable surface would tend to result in short circuiting of the exposed electrode 44 because, as the detector of the present invention operates, a small portion of the spray striking exposed electrode 44 is reflected back toward the head portion 54 of the electrode mount 12. Since the head portion 54 is constructed of Teflon, the reflected spray tends to form beads of moisture, and does not wet the entire surface of the structure, thereby reducing system noise and interference. Naturally, the shape of the head portion 54 is also intended to minimize the flow of condensed fluid droplets onto or through the electrode 44. However, the charged beads of mobile phase solvent which gradually accumulate on the head portion 54 occasionally roll along the head surface and engage the electrode 44 resulting in a noise spike, which appears as an extraneous peak in the output of the chart recorder 50. In order to reduce this noise effect and to thereby enhance the sensitivity of the system, it has been found that positioning a glass capillary tube 74 beneath and touching the Teflon head 54 and drawing a vacuum therewith by means of a water aspirator eliminates this source of noise. Alternatively fixing a thread or fiber to the head portion 54 is helpful. For example, a thread may be secured to the outer periphery of the head portion 54 at a point above the electrode 44. The charged, beaded drops which tend to form on the upper portion of the head adhere to the thread according to the conventional principles of surface tension and tend to run down the fiber without engaging the electrode 44. As a result, extraneous noise pulses from the mobile phase droplets are substantially reduced in the system.

Materials including fatty acids, phenols $\beta$-diketones and their metal chelates, alkylsulfonates, detergents and surface active agents, amino acids, and amine as well as inorganic salts, acids and bases are among the compounds detectable with the apparatus of the present invention to a limit in the range from $10^{-9}$ to $10^{-11}$ g/sec. and with a typical linear dynamic range of from 3 to 4 orders of magnitude. Nonionic organic compounds are also be detected to a limit of approximately $10^{-8}$ g/sec.

Obviously, numerous additional modifications and variations of the present invention are possible in light of the above teachings. It is therefore to be understood that within the scope of the appended claims, the invention may be practiced otherwise than as specifically described herein.

We claim:

1. A method of detecting a solute in a liquid comprising the steps of:

spraying said liquid on a conducting material; and
    measuring an electrical signal produced in said conducting material for detecting said solute.

2. A method as in claim 1, further comprising the steps of:

passing said liquid through a chromatographic column prior to said step of spraying.

3. A method as in claim 1, wherein said step of spraying includes the step of:

developing an electrical signal in said conducting material through the phenomenon produced by a violent rupture of a liquid surface by the action of a gas, liquid, or solid.

4. A method as in claim 1, wherein said step of spraying includes the step of:

propelling said liquid through a nozzle with a pressurized fluid.

5. A method as in claim 1, wherein said step of measuring includes the steps of:

sensing the electrical signal produced in said conducting material and continuously recording said electrical signal as a function of time.

6. A method as in claim 1, further comprising the steps of:

injecting a sample of an unknown composition into a chromatographic column;

separating said unknown composition into discrete solute components with said chromatographic column;

supplying said separating discrete solute components to an aspirator prior to said step of spraying;

supplying a pressurized propellant fluid to said aspirator to provide motive power for said step of spraying;

continuously recording said electrical signal as a function of time to provide an output curve; and determining the quantitative contents of said separated solute components of said unknown composition from said output curve.

7. An apparatus for detecting a solute in a liquid comprising:

a conducting material;

measuring means coupled to said conducting material for measuring a varying electrical signal produced therein; and, spray means positioned near said conducting material for spraying said liquid on said conducting material to develop said varying electrical signal in said conducting material for permitting detection of said solute.

8. An apparatus as in claim 7, further comprising:

chromographic column means coupled to said spray means for supplying compositionally separated solute components to said spray means.

9. An apparatus as in claim 7, further comprising:

fluid pressure supply means coupled to spray means for providing a propelling force to said liquid.

10. An apparatus as in claim 7, wherein:

said conducting material is comprised of glassy carbon.

11. An apparatus as in claim 7, wherein:

said conducting material is comprised of gold.

12. An apparatus as in claim 7, wherein:

said conducting material is comprised of gold plated on platinum.

13. An apparatus as in claim 7, further comprising:

conducting material mounting means engaging said conducting material for insulating said conducting material.

14. An apparatus as in claim 13, wherein said conducting material mounting means includes:

a body portion; and, a head portion integral with said body portionn and containing said conducting material.

15. An apparatus as in claim 14, further comprising:

noise reducing means included on said portion.

16. An apparatus as in claim 15, wherein said noise reducing means includes:

means adjacent said head portion for preventing liquid droplets formed on said head portion from engaging said conducting material.

17. An apparatus as in claim 15, wherein:

said means secured to said head portion includes a fiber for collecting and dispersing said liquid droplets.

18. An apparatus as in claim 15, wherein:

said means adjacent to said head portion comprises a vacuum inlet for drawing said liquid droplets away from said conducting material.

19. An apparatus as in claim 7, wherein:

said spray means comprises a nozzle structure having a liquid inlet and a pressurized fluid inlet.

20. An apparatus as in claim 19, further comprising: a source of pressurized fluid coupled to said nozzle for propelling said liquid through said nozzle; and, control means coupled to said source of pressurized fluid for regulating the pressure and flow rate of said fluid.

21. An apparatus as in claim 7, wherein:

said measuring means includes an electrometer for measuring said varying electrical signal.

22. An apparatus as in claim 8, further comprising:

mobile phase degassing means including a heated reservoir coupled to said chromatographic column.

* * * * *